United States Patent
Pellenc

(10) Patent No.: US 10,307,924 B2
(45) Date of Patent: Jun. 4, 2019

(54) MOTORIZED CUTTING TOOL WITH GUARD

(71) Applicant: PELLENC (Societe Anonyme), Pertuis (FR)

(72) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 0 days.

(21) Appl. No.: 15/513,280

(22) PCT Filed: Nov. 3, 2015

(86) PCT No.: PCT/FR2015/052962
§ 371 (c)(1),
(2) Date: Mar. 22, 2017

(87) PCT Pub. No.: WO2016/083693
PCT Pub. Date: Jun. 2, 2016

(65) Prior Publication Data
US 2017/0239829 A1    Aug. 24, 2017

(30) Foreign Application Priority Data
Nov. 25, 2014    (FR) ..................... 14 61402

(51) Int. Cl.
*B26B 29/04* (2006.01)
*A01G 3/037* (2006.01)
*B23D 29/00* (2006.01)

(52) U.S. Cl.
CPC ............. *B26B 29/04* (2013.01); *A01G 3/037* (2013.01); *B23D 29/005* (2013.01)

(58) Field of Classification Search
CPC ........ A01G 3/033; A01G 3/037; A01G 3/062; A01G 3/0335; A01G 3/053; A01G 3/067;
(Continued)

(56) References Cited

U.S. PATENT DOCUMENTS 3,538,605 A * 11/1970 Smith .................... B26B 29/02
30/295
4,644,648 A * 2/1987 Pellenc .................. A01G 3/033
137/312
(Continued)

FOREIGN PATENT DOCUMENTS

CN    102907268 A    2/2013
CN    203537937    *  4/2014
(Continued)

OTHER PUBLICATIONS

International Search Report for corresponding International Application No. PCT/FR2015/052962.

*Primary Examiner* — Evan H MacFarlane
(74) *Attorney, Agent, or Firm* — Egbert Law Offices, PLLC

(57) ABSTRACT

A portable motorized cutting tool has a motor housed in a tool body, a cutting member, a transmission linking the motor to the cutting member, and at least one guard for protecting the hand of the user, providing a passage for the hand around at least one of a control member of the tool, and a gripping handle of the tool. The tool has a cover capable of occupying a so-called "closed" position against the body of the tool, and a so-called "open" position separated from the body of the tool and giving access to a part of the tool protected by the cover in the closed position, the cover being linked to the body of the tool by the guard.

8 Claims, 2 Drawing Sheets

(58) Field of Classification Search
CPC ........ A01G 3/085; B26B 29/04; B26B 29/02; B26B 15/00; B23D 29/00; B23D 29/002; B23D 29/005; B23D 29/007; B23D 51/01; B25F 5/02
USPC .......................... 30/228, 233, 341, 232, 295
See application file for complete search history.

(56) References Cited

U.S. PATENT DOCUMENTS

| | | | |
|---|---|---|---|
| 9,358,694 B1* | 6/2016 | Heumann | B26B 29/02 |
| 2004/0060178 A1* | 4/2004 | Willer | B27B 9/00 |
| | | | 30/391 |
| 2009/0049699 A1* | 2/2009 | Frenzel | B23D 59/006 |
| | | | 30/390 |
| 2010/0083513 A1 | 4/2010 | Pellenc | |
| 2012/0204699 A1* | 8/2012 | Soltesz | A01G 3/053 |
| | | | 83/697 |

FOREIGN PATENT DOCUMENTS

| | | | |
|---|---|---|---|
| CN | 203537937 U | * | 4/2014 |
| DE | 19849976 A1 | | 5/1999 |

* cited by examiner

MOTORIZED CUTTING TOOL WITH GUARD

TECHNICAL FIELD

The present invention relates to a portable motorized cutting tool and in particular a cutting tool such as pruning shears or sheet-metal shears. The invention can however find applications for other cutting tools and in particular for cutting tools provided with a protective guard for the hand.

STATE OF THE PRIOR ART

Various means can be used to provide protection for a user and in particular the hand of a user gripping a cutting tool, and in particular a guard.

The hand of the user grips the tool by a handle or by the body of the handle forming tool. Near the handle, or the part of the tool intended for gripping, a control member of the tool is generally found which is actionable equally by the hand or by a finger while also holding the tool. For some tools, it can simply be a matter of the switch for running or stopping the tool's motor. For other, more sophisticated, tools, it can involve a trigger or a more complex interface controlling one or more tool functions. For example, for pruning shears a trigger is generally provided for controlling the movement of a cutting blade. For other cutting tools, the trigger can control a speed of movement of the cutting blade, for example the speed of linear motion, or rotation, of a saw blade.

As indicated above, a simple means of protecting the user's hand consists of surrounding a portion of the handle and/or the control member with a guard. The guard protects the hand or finger of the user from possible bumps against obstacles encountered with the tool. It can also avoid the hand sliding on the handle and reaching the cutting member. Another important function of the guard is to prevent obstacles in the work area from coming to bump against the control member and unintentionally and accidentally triggering operation of the tool.

The cutting member, and even the transmission connecting the motor to the cutting member, can also constitute accident hazards for the hand of the user. Also, a number of cutting tools are provided with a protective housing which surrounds, as much as possible, the members for transmission of movement and sometimes a portion of the cutting member.

Because of the mobile nature of some parts of the cutting member, the housing generally cannot be adjusted to perfectly seal around the cutting member. Hence, cutting tools generally produce chips, dust or material relief which can then come to slide between the housing and the cutting member, and which can, often by accumulation, come to impede the cutting member and/or the transmission connecting the motor to the cutting member.

In this case, cleaning operations are needed and the housing must be taken off to get access to the parts to be cleaned.

Similarly, the housing can form an obstacle to replacement of worn parts of the cutting member, for example blades.

A similar difficulty can exist for reaching other internal parts of the tool, which are not directly linked to the cutting operation. It can for example involve sensors, electronic components or connectors that are sensitive to dirtying and require periodic or occasional maintenance.

Thus, and for a number of cutting devices, it seems necessary to take off the housing or a portion of the housing, for example a trap, in order to go ahead with cleaning, maintenance, greasing or replacement of the cutting members.

Opening a hatch or removing the housing generally requires specific tools and is difficult to perform in the field because in particular of an increased risk of losing parts.

BRIEF DESCRIPTION OF THE INVENTION

The present invention aims to overcome these difficulties mentioned above. It also aims to provide both good safety for use of the tool and quick and easy access to the members subject to maintenance operations.

The invention also aims to propose a tool for which some number of maintenance operations can be done at the place of use, without going back to the shop.

To reach these goals, the invention proposes a portable motorized cutting tool comprising a motor housed in a tool body, a cutting member, a transmission connecting the motor to the cutting member, and at least one protective guard for the hand of the user housing a passage for the hand around at least one among a tool control member and a handle for gripping the tool. According to the invention, the tool comprises a cover, where the cover can occupy a position, called "closed", against the tool body and a position, called "open", away from the tool body and providing access to a portion of the tool protected by the cover in the closed position, and where the cover is connected to the tool body by means of the guard in the open position and in the closed position of the cover.

The motor for the tool can be a thermal engine or an electric motor which could drive the cutting member via the transmission. The operation of the motor can be controlled by the control member, and possibly via a control and driving electronic card. Depending on the type of tool, the transmission can comprise a reduction gear and/or a mechanism for conversion of a rotational movement into a translational movement.

In a specific implementation the invention, the protected part of the tool, meaning the part of the tool located under the movable cover, in the closed position thereof, can comprise at least one among the transmission, a part of the cutting member, an attachment for the cutting member, an electric connector and a grease fitting.

That way, in the open position of the cover, it is possible to go ahead with maintenance operations such as cleaning the members thereof, and in particular the transmission, replacing the cutting member, greasing and possibly maintenance operations requiring access to the electronic card via the connector.

In an advantageous implementation of the invention, the guard can be rigidly bound to the cover and mounted pivoting on the tool body in order to pivot the cover between the closed position and the opened position. Additionally, the tool can comprise a lock for keeping the cover in the closed position. The lock can engage with the guard or with the cover.

Because of these arrangements, the removable cover can be taken off quickly and without tools. Because of the attachment of the cover on the guard and the locking, any attachment system by screwing can be avoided and the risk of losing screws or other attachment accessories eliminated. Additionally, by being connected to the guard and rigidly connected with the body of the tool, the risk of losing the cover is also eliminated. Because of these characteristics, it is possible to consider brief maintenance operations at the point of use. It is, for example, possible to change a blade or cutting member, to clean, or even to remove a foreign body. In other words, it is possible to set aside some number of difficulties encountered during the use of the tool without returning the tool to the shop.

By pivoting the guard, in particular around the point of attachment thereof to the body of the tool, the cover can be completely withdrawn from the part of the tool that it protects and, as indicated above, the loss of the cover avoided. The cover can be articulated around a pivot or any other appropriate type of hinge. The articulated attachment of the guard onto the body of the tool can be done on a dedicated anchoring or be done on a fixed part of the housing. Fixed part of the housing means a part which cannot be withdrawn with the cover. It could for example involve a screwed portion of the housing.

In a specific implementation of the lock, it can comprise at least one latch and at least one retainer respectively rigidly connected with the tool body, in the protected part, and with an internal part of the cover. The latch can come to be held in the retainer and can be released from the retainer by flexing the guard. Because of this specific arrangement, the lock members are also protected by the cover. Preferably the guard has a suitable flexibility such that it is possible to exert by hand the force necessary to get the flexion for latching or unlatching of the lock. The guard can be rigid overall and have only a section with a capacity for flexion suited to actuating the lock.

According to another advantageous aspect, at least one of the latch and the retainer can have a closure ramp and an opening threshold. The closure ramp and the opening threshold allow an easy closure of the cover while avoiding an unintended opening. The ramp can in particular be used to advantage for transforming a pressure exerted on the guard from the outside into a flexion force.

A portion of the body of the tool can be configured as a handle. The tool can also have a housing forming a handle. It involves, for example, a fixed housing assembled by screwing.

In a specific conformation of the tool, the tool body can have a first end bearing the cutting member and a second end opposite from the first end having an articulation for the guard. By attaching the guard to a distal end from the one receiving the cutting member, the guard can be lengthened the most. This can be attractive in particular for small size tools. In fact, because of the length of the guard, a sufficient flexion for actuating the latch can be obtained including when the guard is made of an intrinsically rigid material.

The cutting tool can be provided with a safety device actuatable by one of the cover and the guard and prohibiting an activation of the cutting member when the cover is in the open position.

For example, it involves a switch or an optical sensor engaging with the cover or the guard and linked to the electronic card to prohibit supplying the motor with power when the cover is open.

Finally, the invention relates to a cutting tool for pruning shear use, such as previously described, and in particular pruning shears comprising a fixed blade and a mobile blade connected to the transmission by a pivot housed under the cover in the closed position.

Other characteristics and advantages of the invention emerge from the following description of the figures. This description is given for illustration and is nonlimiting.

DETAILED DESCRIPTION OF THE EMBODIMENTS OF THE INVENTION

The following description refers to a specific implementation of the invention for execution of pruning shears. However, and in an entirely similar way, the invention can be applied to other cutting tools, such as hedge trimmers, sheet-metal shears or saws which differ from it essentially in the shape of the cutting member.

Figure 1:
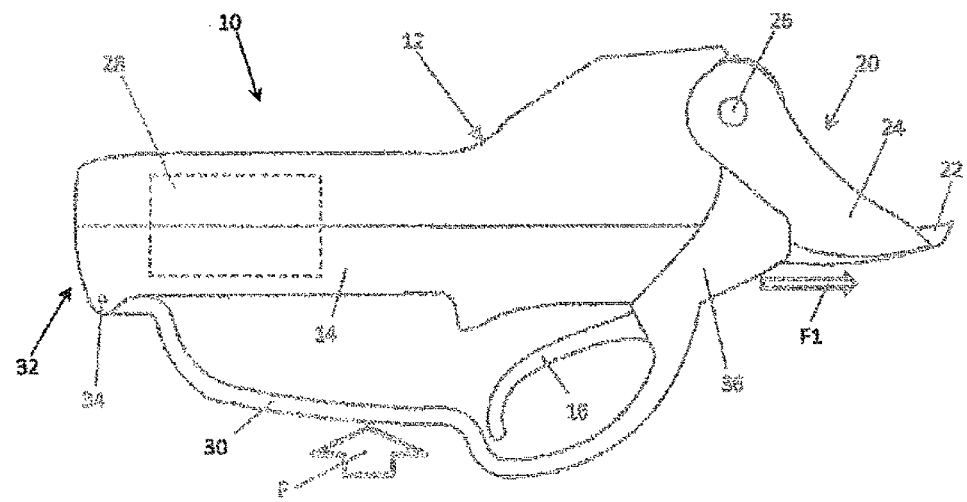
FIG. 1 is a side view of pruning shears conforming to the invention showing a closed position of the cover-guard assembly.

The pruning shear from FIG. 1 has a tool body 10 comprising a plurality of parts rigidly connected together, essentially by screwing. Among these parts, the figure shows a housing 12.

The tool body, and more specifically the housing 12, have a substantially cylindrical part forming a handle 14. The diameter of the part forming handle 14 is adapted such that the user can easily grip the tool with their hand.

The pruning shears from FIG. 1 can also be provided with a remote power unit and a power cord which connect it to the remote power unit. To simplify the figures, these parts are not shown.

A trigger 16 is located to the front of the handle forming part. The trigger can be used as control member, in particular for controlling the opening and closing of a cutting member 20. The position of the trigger is adjusted on the handle 14 in such a way that the trigger can easily be actuated by a finger of the user's hand that grips the handle.

The cutting member 20 mounted on one end of the tool body 10 is provided with a fixed blade 22 and a mobile blade 24 articulated around a pivot 26. The cutting member is shown in a closed blade configuration, meaning with the mobile blade closed onto the fixed blade. A motor 28, housed in the tool body 10, is connected to the mobile blade 24 by a transmission suited to pivot the mobile blade around the pivot 26. In the example described, it involves a brushless electric motor. The transmission can comprise in particular a screw and nut mechanism with bearings transforming a rotational movement of the motor into a translational movement. Control links transmit the translational movement to a cam of the mobile blade. The transmission can also comprise a reduction gear at the output of the motor.

Conforming to the invention, the pruning shear is equipped with a guard 30 which extends the length of the handle 14 and which in part surrounds the trigger 16. The guard can be executed very simply in the form of a metal or plastic bar.

The bar is connected to a rear part 32 of the tool body 10 on which it is articulated. The guard is in particular articulated around a pin 34 forming a pivot.

The front of the guard 30 is connected to a cover 36 which is shown in closed position. In this position, the cover comes to rest against the front part of the tool body 10 where the cutting member 20 is located. In the closed position, the cover constitutes an extension of the fixed part of the housing 12.

Preferably, the cover 36 is formed in a single part with the guard, for example by molding. The cover, like the guard, can be metal parts or, preferably, plastic.

It can be observed that the cover 36 comes to cover over and protect a portion of the cutting member 20.

Figure 2:
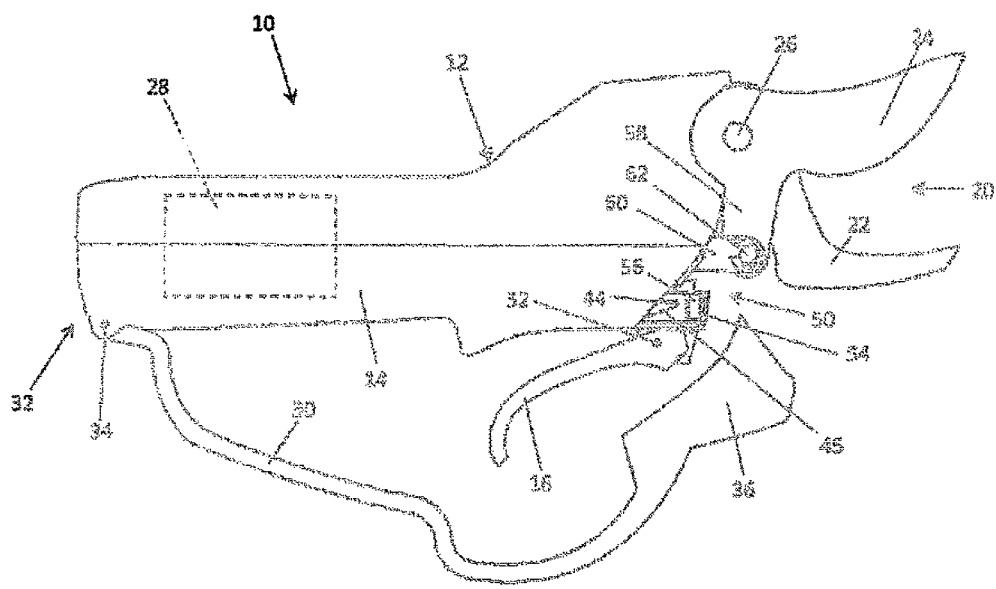
FIG. 2 is a side view of the pruning shears from FIG. 1, with the cover-guard assembly in an open position.

FIG. 2 shows the pruning shears in which the cover 36 is in the open position thereof. The cutting member is also shown open, meaning with the mobile blade 24 raised compared to the fixed blade 22.

The opening of the cover is done very simply by exerting on the guard, preferably in the median part thereof, a force shown by the arrow F visible on FIG. 1 towards the handle 14. This force has the effect of imparting a slight flexion on the guard, which is all the same sufficient for releasing a lock 40 holding the cover closed. The lock is visible in FIG. 3. More specifically, the flexion releases the latches 42 of the lock, connected to the cover 36 from retainers 44 of the lock, rigidly connected with the tool body 10. In fact, observe in FIG. 3 that the lock comprises complementarity latches and retainers, respectively on each side of the body of the tool and the cover. Thus, during application of the force F, the cover 36 is subject to a movement in the direction F1, shown in FIG. 1, forcing the latches 42 to move substantially in the direction F1 until disconnecting from the retainers 44.

The cover can be re-closed, and locked in its closed position, also by pressing on the guard 30 in the same way. In this case, a ramp 47 for the retainers 44 again allows a slight flexion of the guard to make locking easier. The flexion of the guard necessary for engaging the lock, and the ramps 47 of the retainers 44, create a threshold for opening the cover which prevents an unintended opening.

Because of the open position of the cover on FIG. 2, meaning withdrawn from the tool body 10, a part 50 of the tool normally protected by the cover 36 in the closed position thereof can be seen more clearly.

In the example shown, the protected part 50 comprises an articulation 52 of the trigger and an electrical connector 56. The electrical connector 56 is connected to an electronic control and driving card for the motor, not shown. The main function of the electronic card is to drive the power supply for the motor as a function of the control signals issued by a position sensor of the trigger 16. The card can also exercise other functions, such as safety functions. For example, an opening sensor 54 of the cover can be connected to the electronic card to prevent activation of the cutting member when the cover is open. The opening sensor is, for example, a small switch or an optical sensor.

The connector 56, mentioned above, connects the electronic card to an external electronic equipment. Such equipment can be intended, for example, to read or configure operating or management configuration of the tool.

The protected part 50 of the tool also comprises a part of the transmission 60 connecting the motor to the cutting member 20. It can be observed that the transmission 60 comprises control links connected by a pivot 62 to a cam 58 of the mobile blade 24.

When the cover is open, all these parts become accessible; it is in that way possible to clean them, for example by blowing, grease them and/or replace them. In particular, the mobile blade 24 can be replaced when it is dulled or damaged.

When the cover is closed, the members located inside the protected part of the tool, while not being completely protected from being dirty, remain however largely protected. In the same way, the closed cover also prevents accidental access of the user's fingers to the moving internal members.

It can be noted that the previously described members of the lock 40 are also protected by the cover.

Figure 3:
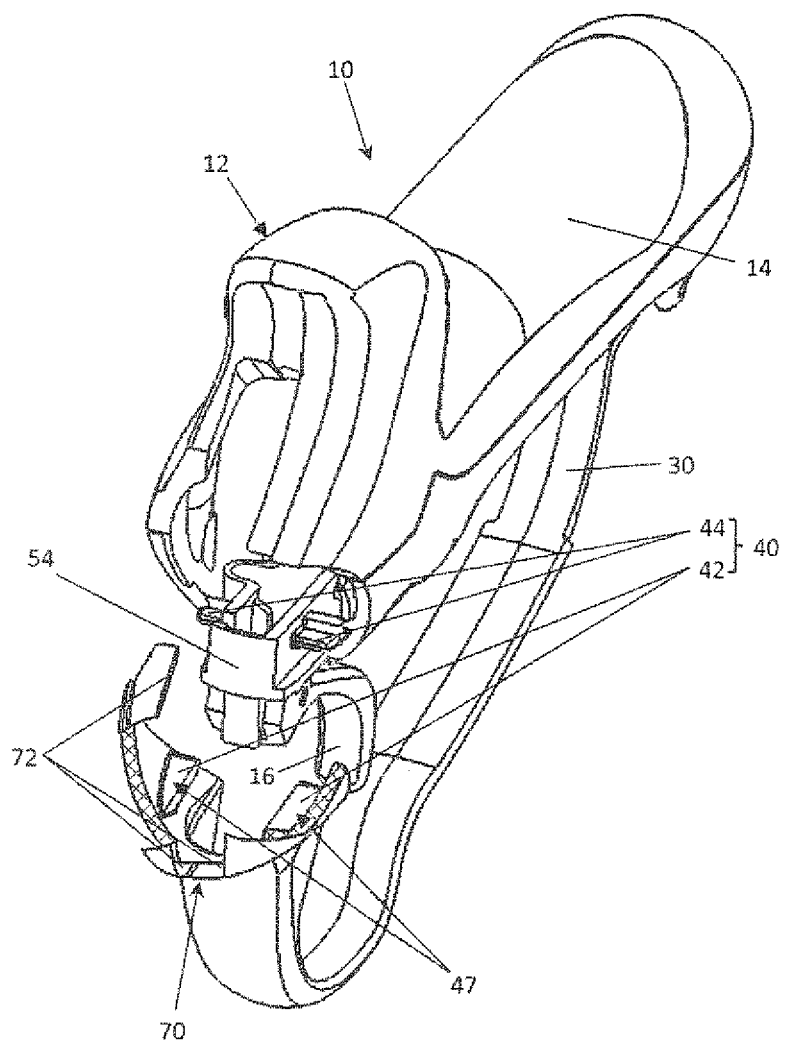
FIG. 3 is a perspective view from the front of the pruning shears from FIGS. 1 and 2 from which some parts are withdrawn.

FIG. 3 shows a perspective view from the front of the pruning shears from FIGS. 1 and 2. In FIG. 3, the cutting mechanism and the transmission thereof are removed, and the cover, in the open position thereof, is shown in partial section. Thus, in FIG. 3 it is possible to better see the latches 42 formed as a single part with the cover on an inner surface of the cover, and the retainers 44 formed on the tool body 10. Preferably a latch and a retainer are provided on each side of the cover and the tool body, relative to the plane of symmetry of the tool passing through the fixed blade 22.

It can be seen that the cover 36 has, in the front part thereof, a passage 70 for blade 22, with sides 72 adjusted on the fixed blade 22 and a part of the mobile blade when it is closed on the mobile blade.

In the closed position of the cover, the sides 72 come closest to the fixed blade, not shown.

The invention claimed is:

1. A portable motorized cutting tool comprising:
   a tool body;
   a motor housed in said tool body;
   a cutting member;
   a transmission connecting said motor to said cutting member;
   a handle defined by a first portion of said tool body;
   a tool control member arranged on a second portion of said tool body between the first portion of said tool body and said cutting member;
   a protective guard adapted to allow a hand of a person using the portable motorized cutting tool to extend around said tool control member and said handle so as to grip the portable motorized cutting tool, the protective guard extends for a length of said handle and surrounds said tool control member, the protective guard being mounted to said tool body by a pivot, said pivot positioned at a rear portion of said tool body opposite to said cutting member relative to said handle;
   a cover integral with said protective guard, said cover pivotable along with said protective guard about said pivot between a closed position against said tool body and an open position away from said tool body, the open position allowing access to a portion of said tool body protected by said cover in the closed position, said cover being connected to said tool body by the protective guard through said pivot in the open position and the closed position of said covert; and
   a lock cooperative with said cover so as to keep said cover in the closed position, said lock being releasable by flexion of said protective guard toward said tool body.

2. The portable motorized cutting tool of claim 1, wherein the portion of the tool body protected by said cover includes at least one of said transmission, a portion of said cutting member, an attachment for said cutting member, and an electric connector.

3. The portable motorized cutting tool of claim 1, said lock comprising at least one latch and at least one retainer, the at least one retainer rigidly connected with the portion of the tool body protected by said cover, wherein the latch is retained in the retainer in one position and is released from the retainer in another position by flexing the protective guard.

4. The portable motorized cutting tool of claim 3, wherein at least one of the latch and the retainer has a closure ramp and an opening threshold.

5. The portable motorized cutting tool of claim 1, wherein said tool body has a housing defining the handle.

6. The portable motorized cutting tool of claim 1, wherein said tool body has a first end bearing said cutting member and a second end that has an articulation for the protective guard, said first end being opposite said second end.

7. The portable motorized cutting tool of claim 1, further comprising:
   a safety device actuatable by said cover.

8. The portable motorized cutting tool of claim 1, wherein the portable motorized cutting tool is a pruning shear, said cutting member has a fixed blade and a movable blade connected to said transmission.

\* \* \* \* \*